(12) United States Patent
Sakata

(10) Patent No.: US 11,124,602 B2
(45) Date of Patent: Sep. 21, 2021

(54) METHOD FOR ADHERING RESIN MOLDED ARTICLES

(75) Inventor: Kouichi Sakata, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 860 days.

(21) Appl. No.: 13/702,885

(22) PCT Filed: May 31, 2011

(86) PCT No.: PCT/JP2011/062478
§ 371 (c)(1),
(2), (4) Date: Feb. 15, 2013

(87) PCT Pub. No.: WO2011/155366
PCT Pub. Date: Dec. 15, 2011

(65) Prior Publication Data
US 2013/0177774 A1 Jul. 11, 2013

(30) Foreign Application Priority Data
Jun. 10, 2010 (JP) .............................. JP2010-133080

(51) Int. Cl.
| | | |
|---|---|---|
| C08G 63/06 | (2006.01) | |
| C08G 63/183 | (2006.01) | |
| C08J 5/12 | (2006.01) | |
| B32B 37/12 | (2006.01) | |
| B32B 25/20 | (2006.01) | |
| B32B 27/36 | (2006.01) | |
| B32B 27/28 | (2006.01) | |
| B32B 27/06 | (2006.01) | |
| B32B 7/12 | (2006.01) | |
| B32B 27/08 | (2006.01) | |
| B32B 7/04 | (2019.01) | |
| C08K 3/016 | (2018.01) | |
| C08K 5/00 | (2006.01) | |
| C08G 63/18 | (2006.01) | |
| C08K 5/541 | (2006.01) | |
| C08G 63/123 | (2006.01) | |
| C08K 5/14 | (2006.01) | |
| C08G 63/127 | (2006.01) | |
| C08K 3/014 | (2018.01) | |
| C08K 5/5415 | (2006.01) | |
| C08G 63/02 | (2006.01) | |
| C08K 5/5419 | (2006.01) | |

(Continued)

(52) U.S. Cl.
CPC .......... *C08G 63/06* (2013.01); *C08G 63/183* (2013.01); *C08J 5/128* (2013.01); *B32B 7/04* (2013.01); *B32B 7/12* (2013.01); *B32B 25/20* (2013.01); *B32B 27/06* (2013.01); *B32B 27/08* (2013.01); *B32B 27/283* (2013.01); *B32B 27/36* (2013.01); *B32B 37/12* (2013.01); *B32B 2037/1253* (2013.01); *C08G 63/02* (2013.01);
*C08G 63/12* (2013.01); *C08G 63/123* (2013.01); *C08G 63/127* (2013.01); *C08G 63/16* (2013.01); *C08G 63/18* (2013.01); *C08G 63/181* (2013.01); *C08J 2367/02* (2013.01); *C08J 2367/03* (2013.01); *C08J 2483/04* (2013.01); *C08K 3/013* (2018.01); *C08K 3/014* (2018.01); *C08K 3/016* (2018.01); *C08K 5/005* (2013.01); *C08K 5/0066* (2013.01); *C08K 5/0083* (2013.01); *C08K 5/14* (2013.01); *C08K 5/541* (2013.01); *C08K 5/5415* (2013.01); *C08K 5/5419* (2013.01); *C08L 67/02* (2013.01); *C08L 67/03* (2013.01); *C09J 183/00* (2013.01); *C09J 183/04* (2013.01); *Y10T 428/31663* (2015.04); *Y10T 428/31786* (2015.04)

(58) Field of Classification Search
None
See application file for complete search history.

(56) References Cited

U.S. PATENT DOCUMENTS

| | | | | |
|---|---|---|---|---|
| 4,080,354 A | * | 3/1978 | Kramer | .................. C08L 67/02 523/522 |
| 4,219,628 A | * | 8/1980 | Weemes | .................. C08L 67/02 525/166 |

(Continued)

FOREIGN PATENT DOCUMENTS

| | | | |
|---|---|---|---|
| EP | 2 305 765 A | * | 4/2011 |
| JP | 07-126496 | * | 5/1995 |

(Continued)

OTHER PUBLICATIONS

"Silicone Chemistry Overview" Dow Corning. (1997) (Year: 1997).*
International Search Report for PCT/JP2011/062478, dated Jun. 28, 2011.

*Primary Examiner* — Vivian Chen
(74) *Attorney, Agent, or Firm* — Knobbe, Martens, Olson & Bear LLP

(57) ABSTRACT

To provide a technique of improving adhesion of a resin molded article including a polyalkylene terephthalate resin to a silicon adhesive. A polyalkylene terephthalate resin is used in which an aromatic dicarboxylic acid excluding terephthalic acid, and/or an ester compound thereof is subjected to copolymerization as a modified component, and the content of the modified component relative to the total dicarboxylic acid component is at least 13 mol % and no more than 35 mol %. It is preferable if the modified polyalkylene terephthalate resin is a modified polybutylene terephthalate resin, and the aromatic dicarboxylic acid and/or an ester compound thereof is isophthalic acid and/or an ester compound thereof.

2 Claims, No Drawings

(51) Int. Cl.
*C08G 63/181* (2006.01)
*C08G 63/16* (2006.01)
*C08K 3/013* (2018.01)
*C08G 63/12* (2006.01)
*C09J 183/04* (2006.01)
*C09J 183/00* (2006.01)
*C08L 67/02* (2006.01)
*C08L 67/03* (2006.01)

(56) References Cited

U.S. PATENT DOCUMENTS

| | | | | |
|---|---|---|---|---|
| 4,322,333 A * | 3/1982 | Kochanowski | ......... | C08L 67/02 524/445 |
| 4,362,839 A | 12/1982 | Tonoki | | |
| 4,369,280 A * | 1/1983 | Dieck | ...................... | C08L 67/02 524/281 |
| 4,373,067 A * | 2/1983 | Dieck | ...................... | C08L 67/02 524/231 |
| 4,393,153 A * | 7/1983 | Hepp | ...................... | C08K 3/34 523/201 |
| 4,536,531 A * | 8/1985 | Ogawa | .................... | C08L 67/02 524/135 |
| 4,564,658 A * | 1/1986 | Liu | ......................... | C08L 67/02 524/504 |
| 4,689,365 A * | 8/1987 | Chacko | ................... | C08L 67/02 524/539 |
| 5,106,933 A * | 4/1992 | Kobayashi | ............ | C09J 183/04 528/15 |
| 5,120,810 A * | 6/1992 | Fujiki | ..................... | C09J 183/04 528/15 |
| 5,132,353 A * | 7/1992 | Wallace | ................... | C08K 3/22 524/432 |
| 5,146,461 A * | 9/1992 | Duschatko | .......... | G06F 11/1044 714/772 |
| 5,149,734 A * | 9/1992 | Fisher | ...................... | C08K 3/30 524/423 |
| 5,164,461 A * | 11/1992 | Mitchell | .............. | C08K 5/5425 525/478 |
| 5,360,858 A * | 11/1994 | Fujiki et al. | .................. | 524/434 |
| 6,004,679 A * | 12/1999 | Mitchell | ................... | B32B 7/12 428/446 |
| 6,743,515 B1 | 6/2004 | Muller | ................. | C08K 5/5435 427/387 |
| 8,142,888 B2 * | 3/2012 | Sakata | ................. | B29C 45/0005 428/325 |
| 8,734,956 B2 * | 5/2014 | Sakata | .................... | C08L 67/02 428/447 |
| 8,906,988 B2 * | 12/2014 | Doi | ...................... | C08K 5/5393 524/115 |
| 9,249,296 B2 * | 2/2016 | Sakata | ..................... | C08J 5/128 |
| 2001/0049414 A1 * | 12/2001 | Muller | ..................... | C08K 5/07 524/588 |
| 2002/0025444 A1 * | 2/2002 | Hebrink et al. | .............. | 428/480 |
| 2002/0028335 A1 * | 3/2002 | Fujiki | ....................... | C08J 5/12 428/447 |
| 2002/0032270 A1 * | 3/2002 | Azechi | ................... | C09J 183/04 524/492 |
| 2002/0132891 A1 * | 9/2002 | Azechi | ................... | C09J 183/04 524/261 |
| 2002/0188073 A1 * | 12/2002 | Uno | ........................ | C08L 67/02 525/166 |
| 2003/0220443 A1 * | 11/2003 | Kameda | ................... | C08L 83/04 524/588 |
| 2005/0042462 A1 * | 2/2005 | Fehn | ........................ | C08L 83/04 428/447 |
| 2005/0089696 A1 * | 4/2005 | Bosshammer | .......... | C08L 83/04 428/447 |
| 2006/0009577 A1 * | 1/2006 | Hara | ........................ | B32B 7/12 524/862 |
| 2006/0142423 A1 * | 6/2006 | Takayama et al. | ........... | 523/217 |
| 2006/0142438 A1 * | 6/2006 | Ishii | ........................ | C08L 67/02 524/100 |
| 2006/0247339 A1 * | 11/2006 | Harashina | ................... | C08K 5/0066 524/100 |
| 2007/0087131 A1 * | 4/2007 | Hutchinson et al. | ......... | 427/533 |
| 2007/0264510 A1 * | 11/2007 | Fehn | ........................ | C08L 83/04 428/447 |
| 2008/0153956 A1 * | 6/2008 | Hara | ........................ | C09J 183/04 524/261 |
| 2008/0178986 A1 * | 7/2008 | Siavoshani | ................ | C09J 5/06 156/73.1 |
| 2009/0208720 A1 * | 8/2009 | Miyamoto | ............... | C08L 67/02 428/220 |
| 2010/0256300 A1 * | 10/2010 | Jandke | .................... | C08L 83/04 524/858 |
| 2010/0261025 A1 * | 10/2010 | Miyamoto | ........ | B29C 45/14311 428/458 |
| 2010/0266857 A1 * | 10/2010 | Sakata et al. | ................. | 428/451 |
| 2010/0267891 A1 * | 10/2010 | Sakata et al. | ................. | 524/523 |
| 2012/0028063 A1 * | 2/2012 | Sakata | ..................... | 428/480 |
| 2014/0322551 A1 * | 10/2014 | Sakata | ..................... | 428/480 |
| 2017/0342260 A1 * | 11/2017 | Sakata | .................... | B29C 45/14 |
| 2019/0249003 A1 * | 8/2019 | Osano | ...................... | C08K 7/14 |

FOREIGN PATENT DOCUMENTS

| | | | |
|---|---|---|---|
| JP | 7-126496 A | | 5/1995 |
| JP | 10-316844 A | * | 12/1998 |
| JP | 2001-040194 | * | 2/2001 |
| JP | 2001-40194 A | | 2/2001 |
| JP | 2002-338797 A | | 11/2002 |
| JP | 2004-204170 A | | 7/2004 |
| JP | 2005-178097 | * | 7/2005 |
| JP | 2007-091842 A | * | 4/2007 |
| JP | 2008-120925 A | | 5/2008 |
| JP | 2009-5911 A | | 1/2009 |
| JP | 2009-149018 A | | 7/2009 |
| JP | 2009-155449 | * | 7/2009 |
| JP | 2009-155449 A | | 7/2009 |
| JP | 2009-185129 A | * | 8/2009 |
| WO | WO 1998/024953 A1 | | 6/1998 |
| WO | 2009/081572 A1 | | 2/2009 |
| WO | WO 2010/081549 A | * | 7/2009 |

* cited by examiner

US 11,124,602 B2

METHOD FOR ADHERING RESIN MOLDED ARTICLES

CROSS-REFERENCE TO RELATED APPLICATIONS

This application is the National Stage of International Application No. PCT/JP2011/062478, filed May 31, 2011, which claims the benefit of Japanese Application No. 2010-133080, filed Jun. 10, 2010, the entire contents of all of which are incorporated by reference herein.

Field of the Invention

The present invention relates to a modified polyalkylene terephthalate resin for improving adhesion, a resin composition containing this resin, a resin molded article made by molding this resin composition, and a bonded article in which this resin molded article is adhered to another molded article.

BACKGROUND OF THE INVENTION

Polyalkylene terephthalate resins are used in various fields as engineering plastics due to having superior mechanical strength, heat resistance, electrical properties and moldability.

Among polyalkylene terephthalate resins, polybutylene terephthalate resin has particularly superior mechanical strength, electrical properties, and other physical and chemical properties, and is superior in workability. As a result, polybutylene terephthalate resin has been used in a wide range of applications such as automotive, electrical and electronic components as engineering plastics.

According to the application, it is necessary to bond a plurality of resin molded articles. As a method of bonding resin molded articles, various bonding methods are known such as bonding by adhesives, double molding, hot plate welding, vibration welding and laser welding. Selection of the bonding method is done by considering the form, etc. of the resin molded articles, and the suitable bonding method will differ depending on the application. In addition, since the welding process is difficult in the bonding with other resins or metal, methods like adhering and screwing, or swaging are common.

For example, in applications such as cases accommodating a substrate to which electronic components are mounted, used with the object of mitigating the damage from moisture, dust, external impacts, etc., insert molded articles in which a sensor probe, connector terminals or the like are arranged, etc., bonding by adhesives and protecting by potting are the most common.

As the adhesive, although epoxy-based adhesives, silicone-based adhesives, etc. can be used, silicone-based adhesives are preferably used in components for which heat resistance, cold resistance, etc. are demanded. In addition, improvements in adhesiveness between resin molded articles and silicone-based adhesives have been advancing, for example, and technology is known that improves the adhesive strength between a resin molded article containing polybutylene terephthalate resin and silicone-based adhesive (Patent Documents 1 and 2).

For example, a polybutylene terephthalate resin having favorable adhesiveness with silicone-based adhesives has been disclosed in Patent Document 1. In addition, a method of improving the adhesiveness of resin molded articles with silicone-based adhesives by having a specific elastomer and glass fiber contained in the polybutylene terephthalate resin is disclosed in Patent Document 2.

In recent years, resin molded articles have been considered for use in applications exposed to more severe environments than conventional. In cases exposed to more severe environments, it is necessary to also further raise the adhesiveness between resin molded articles and silicone-based adhesives.

However, modified polybutylene terephthalate resins have been known that contain monomers such as isophthalic acid compound as a copolymerization component (Patent Documents 3 and 4). Patent Document 3 discloses technology that facilitates adherence to other components employing a decline in the melting point by the degree of crystallization declining. Patent Document 4 employs technology that suppresses the deformation during mold shrinkage by a decline in the degree of crystallization.

Patent Document 1: Japanese Unexamined Patent Application, Publication No. 2001-040194
Patent Document 2: PCT International Publication No. 2009/081572
Patent Document 3: Japanese Unexamined Patent Application, Publication No. 2009-005911
Patent Document 4: Japanese Unexamined Patent Application, Publication No. 2009-155449

Summary of the Invention

Problems to be Solved by the Invention

The present invention has been made in order to solve the above-mentioned issues, and an object thereof is to provide technology that raises the adhesiveness of a resin molded article containing polyalkylene terephthalate resin to a silicone-based adhesive.

Means for Solving the Problems

In order to solve the above-mentioned issues, the present inventors have conducted thorough research. As a result, it was found that the above-mentioned issues can be solved by using a polyalkylene terephthalate resin in which an aromatic dicarboxylic acid excluding terephthalic acid and/or an ester compound thereof are copolymerized as modified components, and the content of the above-mentioned modified components relative to total dicarboxylic acid component is at least 13 mol % and no more than 35 mol %, thereby arriving at completion of the present invention. More specifically, the present invention provides the following matters.

According to a first aspect of the present invention, in a modified polyalkylene terephthalate resin for improving adhesion, an aromatic dicarboxylic acid excluding terephthalic acid, and/or an ester compound thereof is subjected to copolymerization as a modified component, and the content of the modified component relative to the total dicarboxylic acid component is greater than or equal to 13 mol % and less than or equal to 35 mol %.

According to a second aspect of the present invention, in the modified polyalkylene terephthalate resin for improving adhesion as described in the first aspect, the modified polyalkylene terephthalate resin is a modified polybutylene terephthalate resin.

According to a third aspect of the present invention, in the modified polyalkylene terephthalate resin for improving adhesion as described in the first or second aspect, the aromatic dicarboxylic acid and/or the ester compound thereof is isophthalic acid and/or an ester compound thereof.

According to a fourth aspect of the present invention, a resin molded article is formed by molding the modified polyalkylene terephthalate resin composition for improving adhesion as described in any one of the first to third aspects.

According to a fifth aspect of the present invention, in a bonded article in which a pair of the resin molded articles is adhered through a silicon adhesive, at least one of the pair of resin molded articles is the resin molded article as described in the fourth aspect.

Effects of the Invention

According to the present invention, by using a modified polyalkylene terephthalate resin in which aromatic dicarboxylic acid excluding terephthalic acid and/or an ester compound thereof are copolymerized as modified components, and the content of the above-mentioned modified component relative to the total dicarboxylic acid component is adjusted to at least 13 mol % and no more than 35 mol %, it is possible to greatly improve the adhesiveness between a resin molded article and silicone-based adhesive.

DETAILED DESCRIPTION OF THE INVENTION

An embodiment of the present invention will be explained in detail hereinafter. It should be noted that the present invention is not to be limited to the following embodiment.
Modified Polyalkylene Terephthalate Resin for Improving Adhesion A modified polyalkylene terephthalate resin for improving adhesion of the present invention (may be referred to as "polyalkylene terephthalate resin of the present invention" in the present disclosure) contains aromatic dicarboxylic acid excluding terephthalic acid and/or an ester compound thereof as a modified component, in which the content of the above-mentioned modified component is at least 13 mol % and no more than 35 mol % relative to total dicarboxylic acid component. The above-mentioned modified component grants a bent structure to a macromolecule. If a bent structure is granted to a macromolecule, the degree of crystallization may decline, and part of the physical properties such as mechanical strength may decline; however, the adhesiveness with a silicone-based adhesive described later will drastically improve.

If the content of the above-mentioned modified component is at least 13 mol %, the adhesiveness of the resin molded article obtained using the resin of the present invention to a silicone-based adhesive can be improved, which is preferable. It is also a preferable case when taking productivity into considering when the content of the above-mentioned modified component is no more than 35 mol %, because a decline in the physical properties of the polyalkylene terephthalate resin due to a decline in the degree of crystallization is suppressed, and further, solidification is sufficient upon molding the resin due to the melting point difference with the unmodified polyalkylene terephthalate being small, and molding cycle becomes a favorable range. The upper limit of the content can be appropriately set according to the application.

The polyalkylene terephthalate resin of the present invention is a resin obtained by carrying out polycondensation of dicarboxylic acid component and a glycol component containing alkylene glycol or an ester compound thereof. The alkylene terephthalate resin of the present invention contains an aromatic dicarboxylic acid excluding terephthalic acid and/or an ester compound thereof (modified component) as a dicarboxylic acid component. This does not mean to exclude containing terephthalic acid as a copolymerization component. In other words, resins containing terephthalic acid as a copolymerization component, and containing an aromatic dicarboxylic acid excluding terephthalic acid and/or an ester compound thereof as a copolymerization component are also included in the resin of the present invention.

As the aromatic dicarboxylic acid excluding terephthalic acid and/or an ester compound thereof, for example, $C_{8-14}$ aromatic dicarboxylic acids such as isophthalic acid, phthalic acid, 2,6-naphthalene dicarboxylic acid and 4,4'-dicaryboxy diphenyl ether; $C_{4-16}$ alkane dicarboxylic acids such as succinic acid, adipic acid, azelaic acid and sebacic acid; $C_{5-10}$ cycloalkane dicarboxylic acids such as cyclohexane dicarboxylic acid; ester-forming derivatives of these dicarboxylic acid components ($C_{1-6}$ alkyl ester derivative, acid halide, etc.) can be exemplified. These dicarboxylic acid components can be used individually or by combining two or more types. The use of isophthalic acid and/or an ester compound thereof as the aromatic dicarboxylic acid excluding terephthalic acid and/or an ester compound thereof (modified component) is particularly preferable.

As the glycol component, for example, $C_{2-10}$ alkylene glycols such as 1,4-butanediol, ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic diols such as cyclohexane dimethanol and hydrogenated bisphenol A; aromatic diols such as bisphenol A and 4,4'-dihydroxybiphenyl; $C_{2-4}$ alkylene oxide adducts of bisphenol A such as ethyleneoxide 2 molar adduct of bisphenol A and propylene oxide 3 molar adduct of bisphenol A; or ester-forming derivatives of these glycols (acetyl compounds, etc.) can be exemplified. These glycol components can be used individually or by combining two or more types.

As described above, although it is possible to use various dicarboxylic acid components and glycol components, in the present invention, it is particularly preferable to be modified polybutylene terephthalate resin. The modified polybutylene terephthalate resin is a resin containing terephthalic acid, an aromatic dicarboxylic acid excluding terephthalic acid and/or an ester compound thereof (modified component) as a dicarboxylic acid component, and containing 1,4-butanediol as a glycol component.

As described above, the modified polybutylene terephthalate resin contains the above-mentioned modified component in at least 13 mol % and no more than 35 mol % relative to the total dicarboxylic acid component. As described above, if containing the modified component, there is a trend for the degree of crystallization declining, thereby causing the physical properties, etc. to decline. However, since the polybutylene terephthalate resin has extraordinarily superior physical properties among polyalkylene terephthalate resins, even if the physical properties slightly decline due to the above-mentioned decline in the degree of crystallization, it is possible to impart to the resin molded article extraordinarily superior mechanical strength, electrical properties, and other physical and chemical properties. In addition, high adhesiveness with silicone adhesives can also be imparted to the obtained resin molded article.

Furthermore, the polyalkylene terephthalate resin of the present invention can also contain components other than the monomers described above in a range that does not inhibit the effects of the present invention.

The amount of terminal carboxyl groups in the polyalkylene terephthalate resin of the present invention is not particularly limited so long as not obstructing the object of the present invention. The amount of terminal carboxyl groups in the polyalkylene terephthalate resin used in the present invention is preferably no more than 30 meq/kg, and more preferably no more than 25 meg/kg. In a case of using a polyalkylene terephthalate resin with an amount of terminal carboxyl groups in such a range, it will become less susceptible to a strength decline due to hydrolysis under a moist, hot environment.

In addition, the melt index (MI) of the polyalkylene terephthalate resin of the present invention is not particularly limited to a range so long as not obstructing the object of the present invention. The above-mentioned melt index is preferably at least 5 g/10 min and no more than 140 g/10 min. Furthermore, it is more preferably at least 20 g/10 min and no more than 100 g/10 min. In the case of using a polyalkylene terephthalate resin with a melt index in such a range, the resin composition will be particularly superior in moldability. The above-mentioned melt index is measured by a method based on ASTM D-1238, under conditions of 235° C. and load of 2160 g. It should be noted that the melt index can also be adjusted by blending a polyalkylene terephthalate resin having a different melt index, other resins, and other components (additives, etc.).

The degree of crystallization of the polyalkylene terephthalate resin of the present invention is not particularly limited; however, lower is generally considered to be preferable. For example, it is assumed preferable to be no more than 22% when calculated with the following numerical formula (I). There is a trend of a macromolecule more easily becoming a bent structure as the content of the above-mentioned modified component increases. Therefore, the degree of crystallization can be adjusted by adjusting the content of the modified component. It should be noted that, when the degree of crystallization is established to use a value obtained by a derivation method using the following numerical formula (I), an effect of an adhesiveness improvement with silicone-based adhesives is remarkably expressed when the degree of crystallization is no more than 22%.

$$\text{Degree of Crystallization (\%)} = \{\rho_c(\rho - \rho_a)/\rho(\rho_c - \rho_a)\} \times 100 \quad (I)$$

(In the numerical formula (I), $\rho$ is the density of the resin serving as the measurement target, $\rho_a$ being the density in a case considering the resin that is the measurement target as having 0% degree of crystallization, and $\rho_c$ being the density in a case considering the resin that is the measurement target as having 100% degree of crystallization.)

Although the production method of the polyalkylene terephthalate resin of the present invention is not particularly limited, it can be appropriately produced by a conventional, known method such as interfacial polycondensation, melt polymerization and solution polymerization employing condensation reaction or transesterification reaction. In addition, the degree of polymerization of the resin can be further raised by heat treating and solid-phase polymerizing the obtained resin under reduced pressure or in the presence of inert gas.

Modified Polyalkylene Terephthalate Resin Composition for Improving Adhesion

A modified polyalkylene terephthalate resin composition for improving adhesion of the present invention (hereinafter may be referred to as "resin composition of the present invention") contains the above-mentioned modified polyalkylene terephthalate resin for improving adhesion, and may also contain an adhesiveness improver for improving the adhesiveness with silicone-based adhesives of resins other than modified polyalkylene terephthalate. Due to being similar to the above explanation, an explanation for the modified polyalkylene terephthalate resin for improving adhesion will be omitted.

Adhesiveness Improver

Adhesiveness improver is a component for improving the adhesiveness with silicone adhesives of resins other than of the modified polyalkylene terephthalate. For example, styrene-based thermoplastic elastomers, polysiloxanes having hydrogen atoms bonded to silicon atoms and trialkoxysilylalkyl groups, organic peroxides, and siloxanes or silanes having an acryloxyalkyl group, and compounds containing silicon such as polysiloxanes having an epoxy group and/or ester group bonded to a silicon atom and a hydrogen atom directly bonded to a silicon atom can be exemplified. In addition, other than these compounds, compounds that are conventionally known as components that improve adhesiveness with silicone-based adhesives and compounds having a structure contributing to an adhesiveness improvement with silicone-based adhesives are also adhesiveness improvers.

Other Components

In the resin composition of the present invention, other resins may be contained in ranges that do not inhibit the effects of the present invention, and conventional, known additives such as nucleating agents, pigments, antioxidants, stabilizers, plasticizers, lubricants, mold-release agents and flame retardants may be contained in ranges not inhibiting the effects of the present invention.

Preparation of Resin Composition

The above-mentioned resin composition of the present invention can easily be prepared using general equipment and method used in the preparation of conventional resin compositions.

Resin Molded Article

The resin molded article of the present invention is made by molding the above-mentioned resin composition of the present invention. The molded article of the present invention is superior in adhesiveness with silicone-based adhesives, as described later. The silicone adhesive is also described later.

A conventionally known method can be used as the molding method upon producing the resin molded article. As conventionally known molding methods, for example, an injection molding method, injection compression molding method, gas-assist injection molding method, heated compression molding method, extrusion molding method, blow molding method and the like can be exemplified.

Bonded Article

The bonded article of the present invention is a bonded article in which a pair of molded articles has been adhered through a silicone-based adhesive, where at least one of the above pair of molded articles is the resin molded article of the present invention. The resin molded article of the present invention is superior in adhesiveness with silicone-based adhesives; therefore, the problem of adhesive failure at locations at which the resin molded article of the present invention and the silicone-based adhesive adhere almost does not occur.

In addition, if both of the pair of molded articles are established as the resin molded articles of the present invention, it will become more difficult for the problem of adhesive failure to occur due to both molded articles having high adhesiveness with the silicone-based adhesive. Then, since the adhesiveness between the silicone-based adhesive and both molded articles will be high, the pair of molded articles will be more strongly bonded.

The silicone-based adhesive is an adhesive that cures at room temperature or by heating, and a conventionally known one can be used; however, it is particularly preferable to use an addition reaction-type silicone adhesive for which curing progresses by addition reaction with a platinum-based catalyst.

Next, the method of producing the bonded article will be explained. The method of producing the bonded article is not particularly limited; however, it can be produced by the following such method, for example.

Herein, a case of bonding a first resin molded article and a second resin molded article will be explained. The number of molded articles to be bonded may be two or more.

First, a silicone-based adhesive is arranged on the first resin molded article. The arrangement method is not particularly limited, and methods such as brush application and potting can be exemplified, for example. Next, the second resin molded article is placed on the silicone-based adhesive arranged on the first resin molded article, and, as necessary, pressure is applied in the direction in which the first resin molded article and the second resin molded article are stacked so that the first resin molded article and the second resin molded article adhesively bond. Finally, the silicone-based adhesive is cured at room temperature or by heating.

EXAMPLES

Although the present invention will be specifically explained hereinafter showing Examples and Comparative Examples, the present invention is not to be limited to these Examples.

Materials

Non-modified polybutylene terephthalate resin 1 (non-modified PBT1): trade name "Duranex 400FP" made by Polyplastics Co., Ltd. (melt index (MI): 45 g/10 min)

Non-modified polybutylene terephthalate resin 2 (non-modified PBT2): trade name "Duranex 500FP" made by Polyplastics Co., Ltd. (melt index (MI): 20 g/10 min)

It should be noted that the melt index was measured by a method based on ASTM D-1238 under the conditions of 235° C. and load of 2160 g.

Modified polybutylene terephthalate resin 1 (modified PBT1): 12.5 mol % isophthalic acid modified polybutylene terephthalate (melt index (MI): 46 g/10 min)

Modified polybutylene terephthalate resin 2 (modified PBT2): 15 mol % isophthalic acid modified polybutylene terephthalate (melt index (MI): 46 g/10 min)

Modified polybutylene terephthalate resin 3 (modified PBT3): 17 mol % isophthalic acid modified polybutylene terephthalate (melt index (MI): 30 g/10 min)

Modified polybutylene terephthalate resin 4 (modified PBT4): 30 mol % isophthalic acid modified polybutylene terephthalate (melt index (MI): 46 g/10 min)

Adhesive

Silicone-based adhesive: trade name "SE1714" made by Dow Corning Toray Silicone Corp.

Epoxy-based adhesive: trade name "XNR3503" made by Nagase Chemtex Corp.

Production of Resin Molded Article

Non-modified polybutylene terephthalate resins 1 and 2, and modified polybutylene terephthalate resins 1 to 4 were respectively charged into an injection molding machine (S2000i 100B made by Fanuc Ltd.), and resin test specimen to be used in the measurement of adhesive strength described later (multipurpose test specimen based on ISO3167) were prepared. Resin molded articles of Examples 1 to 3 and resin molded articles of Comparative Examples 1 to 3 were obtained.

Preparation of Bonded Article

A central part of the multipurpose test specimen based on ISO3167 was cut, Nitoflon adhesive tape (thickness of 0.18 mm) made by Nitto Denko Corp. in which a hole of 7 mm×7 mm was opened was pasted to one resin test specimen, and a silicone-based adhesive was coated in the portion of the hole. After coating, another resin test specimen was overlapped and fixed by clips to carry out adhesive bonding under the condition of 120° C. for 1 hour. The bonded articles of Examples 1 to 3 and bonded articles of Comparative Examples 1 to 3 prepared using silicone-based adhesives were obtained.

Bonded articles were produced by the same method as the above-mentioned bonded articles, except for changing the silicone-based adhesive to an epoxy-based adhesive, and changing the curing conditions to 120° C. for 0.5 hours. Bonded articles of Examples 1 to 3 and bonded articles of Comparative Examples 1 to 3 prepared using epoxy-based adhesive were obtained.

Measurement of Adhesive Strength

The bonded articles were left for at least 24 hours in an environment of 23° C. and 50% RH, then the other adhesive bonded resin test specimen was pressed and torn under conditions of a press/tear test speed of 5 mm/min using a universal tension tester RTC-1325 PL made by Orientec Co., Ltd., and the highest value for the press/tear strength was measured. The measurement results are shown in Table 1.

Measurement of Degree of Crystallization

As a reference value, the degree of crystallization of each resin of the non-modified polybutylene terephthalate resins 1 and 2 and modified polybutylene terephthalate resins 1 to 4 were measured. The density of each resin was measured by a water displacement method (based on JIS K7112). In accordance with the above-mentioned numerical formula (I), the degree of crystallization was calculated with the crystalline density $\rho c=1.40$ and amorphous density $\rho a=1.28$ for the polybutylene terephthalate according to the Saturated Polyester Resin Handbook (The Nikkan Kogyo Shimbun, Ltd.).

TABLE 1

|  | Example 1 | Example 2 | Example 3 | Comparative Example 1 | Comparative Example 2 | Comparative Example 3 |
|---|---|---|---|---|---|---|
| Non-modified PBT1 (mass %) |  |  |  | 100 |  |  |
| Non-modified PBT2 (mass %) |  |  |  |  | 100 |  |
| Modified PBT1 (mass %) |  |  |  |  |  | 100 |
| Modified PBT2 (mass %) | 100 |  |  |  |  |  |
| Modified PBT3 (mass %) |  | 100 |  |  |  |  |
| Modified PBT4 (mass %) |  |  | 100 |  |  |  |
| Content of modified component (mol %) | 15 | 17 | 30 | 0 | 0 | 12.5 |

TABLE 1-continued

|  | Example 1 | Example 2 | Example 3 | Comparative Example 1 | Comparative Example 2 | Comparative Example 3 |
|---|---|---|---|---|---|---|
| Silicone-based adhesive strength (MPa) | 2.8 | 3.1 | 5.5 | 2.1 | 2.1 | 2.1 |
| Epoxy-based adhesive strength (MPa) | 2.0 | 1.8 | 2.0 | 2.1 | 2.1 | 2.0 |
| Degree of crystallization (%) | 20.8 | 19.2 | 16.4 | 31.1 | 25.5 | 22.4 |

As is evident from the results of the Examples and Comparative Examples, it has been confirmed that the silicone adhesive strength improves with a content of modified component of at least 13 mol %.

As is evident from the results of the Examples, the effect of the adhesive strength of the above-mentioned bonded article rising has been confirmed in the case of using silicone-based adhesives. In a case of using epoxy-based adhesives, it has been confirmed as being an adhesive strength equivalent to non-modified PBT also with modified PBT.

As is evident from the results of the Examples, it has been confirmed that the silicone adhesive strength improves with resins having lower degrees of crystallization as the content of modified component increases.

The invention claimed is:

1. A method for adhering a first modified polybutylene terephthalate resin molded article to a second resin molded article, comprising:
   (a) providing the modified polybutylene terephthalate resin, which is prepared by a method comprising:
      (i) copolymerizing an isophthalic acid and/or an ester compound thereof as a modified component with a polybutylene terephthalate resin, wherein the content of the modified component relative to the total dicarboxylic acid component is at least 15 mol % and no more than 30 mol % to produce a modified polybutylene terephthalate resin; and
      (ii) molding the modified polybutylene terephthalate resin into the first modified polybutylene terephthalate resin molded article and the second resin molded article; and
   (b) adhering the first modified polybutylene terephthalate resin molded article to the second resin molded article with an addition reaction-type silicone adhesive,
      wherein both the first modified polybutylene terephthalate resin molded article and the second resin molded article are made of the same modified polybutylene terephthalate resin, wherein the modified polybutylene terephthalate resin consists of the isophthalic acid-modified polybutylene terephthalate resin, and optionally one or more additives selected from the group consisting of nucleating agents, pigments, antioxidants, stabilizers, plasticizers, lubricants, mold-release agents, flame retardants and adhesiveness improvers, and wherein the isophthalic acid-modified polybutylene terephthalate resin is the only resin present in each of the first and second resin molded articles.

2. The method according to claim 1, wherein the modified polybutylene terephthalate resin includes an adhesiveness improver selected from the group consisting of polysiloxanes having hydrogen atoms bonded to silicon atoms and trialkoxysilylalkyl groups, organic peroxides, and siloxanes or silanes having an acryloxyalkyl group, and polysiloxanes having an epoxy group and/or ester group bonded to a silicon atom and a hydrogen atom directly bonded to a silicon atom.

* * * * *

UNITED STATES PATENT AND TRADEMARK OFFICE
CERTIFICATE OF CORRECTION

PATENT NO. : 11,124,602 B2  
APPLICATION NO. : 13/702885  
DATED : September 21, 2021  
INVENTOR(S) : Kouichi Sakata Page 1 of 1

It is certified that error appears in the above-identified patent and that said Letters Patent is hereby corrected as shown below:

In the Specification

In Column 5, Line 43 approx., delete "$(\rho_c-\rho_c)\}$" and insert --$(\rho_c-\rho_a)\}$--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*